United States Patent
Tsai et al.

(10) Patent No.: US 7,333,547 B2
(45) Date of Patent: Feb. 19, 2008

(54) METHODS AND DEVICES FOR DYNAMIC QUANTIZING INPUT OF A SOFT DECISION DECODER

(75) Inventors: Yi-Yuan Tsai, Hsinchu (TW); Hung-Yi Chen, Xindian (TW)

(73) Assignee: Benq Corporation, Taoyuan (TW)

( * ) Notice: Subject to any disclaimer, the term of this patent is extended or adjusted under 35 U.S.C. 154(b) by 685 days.

(21) Appl. No.: 10/891,353

(22) Filed: Jul. 14, 2004

(65) Prior Publication Data
US 2006/0013323 A1    Jan. 19, 2006

(51) Int. Cl.
*H04B 14/06* (2006.01)
(52) U.S. Cl. .................. 375/245; 341/200
(58) Field of Classification Search ............. 375/245; 341/200, 126, 131
See application file for complete search history.

(56) References Cited

U.S. PATENT DOCUMENTS 6,515,609 B1 *   2/2003   Moulsley .................. 341/155

* cited by examiner

*Primary Examiner*—Kevin Kim
(74) *Attorney, Agent, or Firm*—Thomas, Kayden, Horstemeyer & Risley

(57) ABSTRACT

Dynamic quantization methods and dynamic quantizers for quantizing soft outputs of an equalizer according to the channel condition in order to alleviate the computational load on a soft decision decoder. The dynamic quantizer assigns only a few bits to represent the equalized signals when the channel condition is good, thus reducing computational burden on the soft decision decoder.

22 Claims, 5 Drawing Sheets

METHODS AND DEVICES FOR DYNAMIC QUANTIZING INPUT OF A SOFT DECISION DECODER

BACKGROUND

The present invention relates to dynamic quantization, and more specifically, to a dynamic quantization method for the input of a soft decision decoder.

The purpose of a communication system is to transmit signals carrying information through a communication channel separating the transmitter from the receiver. FIG. 1 is a block diagram illustrating a conventional receiver of a digital communication system. The signals must be modulated to shift the original frequency range into other frequency ranges suitable for transmission, thus the receiving end must comprise a demodulator which reverses the modulation process. As shown in FIG. 1, the signal received by an antenna 11 is first passed to a demodulator 12. A Soft Output Viterbi Algorithm (SOVA) equalizer 13 receives the demodulated signal from the demodulator 12 and performs signal equalization according to the output of a channel estimator 14. An equalizer is generally required in the receiver to combat the inter symbol interference (ISI) induced when the channel bandwidth is close to the signal bandwidth as the ISI is caused by multi-path within time dispersive channel. According to the possible output values, the equalizer is partitioned into two categories, hard decision equalizer and soft decision equalizer. The output values of the hard decision equalizer are limited to only two possible values, "+1" and "−1". For the soft decision equalizer, however, a variety of output values may be obtained. When the hard decision equalizer is employed, significant distortion is inevitable because of the simple implementation. As shown in FIG. 1, the equalizer 13 may enhance its performance by employing the soft output Viterbi algorithm (SOVA). The output values of the SOVA equalizer 13 are however not ranged, as a result, it is difficult to represent the output values with a limited set of bits.

A quantizer 15 is thus utilized to limit the values of the SOVA output signals by assigning them into a finite set of possible values. Quantization is the process of mapping a continuous range of amplitudes of a signal into a finite set of discrete values. Although the increase of quantization levels may improve the performance, extra computation burden is placed on the decoder.

The quantizer 15 determines the number of quantization levels regardless of channel conditions. Redundant bits may be used to represent the equalized outputs when the output signals of the SOVA equalizer 13 are highly reliable. It turns out that the soft Viterbi decoder 16 may suffer from unnecessary computational burden, and moreover, more power consumption is expected.

The output of the quantizer 15 is fed to a soft Viterbi Decoder 16 for data recovery. Similar to the equalizer, decoders can be categorized as hard decision decoders or soft decision decoders. The Viterbi algorithm performs efficient Maximum Likelihood Sequence Estimation (MLSE), a popular algorithm applicable to both soft decision equalizer and decoders. By implementing the Soft output Viterbi algorithm (SOVA) that accepts and delivers soft sample values, the signal to noise ratio (SNR) can be significantly improved. Generally, soft decision decoding is superior to hard decision decoding by approximately 2~3 dB, but a soft decision decoder is more complicated as it performs additional computations to handle the soft sample values.

SUMMARY

Accordingly, embodiments of the invention provide methods of alleviating the computational load on the soft decision decoder in a receiver.

Embodiments of the invention additionally provide reduced power consumption in the receiver when the channel condition is determined to be good.

An exemplary dynamic quantizer, a dynamic quantization method, and a wireless communication receiver implementing the dynamic quantizer are disclosed.

In an embodiment, a receiver comprises a reception unit, a demodulator, an equalizer, a dynamic quantizer proposed in the invention, and a decoder. The reception unit receives signals from a dynamically fading channel, and passes the signals to a demodulator for demodulation. The equalizer equalizes the demodulated signals according to an estimated fading of the received signals. The dynamic quantizer quantizes the equalized signals adaptively relying on a predicted channel condition since it assigns less states of quantization when the predicted channel condition is good. The decoder couples to the dynamic quantizer and decodes the quantized signals. The equalizer and the decoder of the invention enhance performance by employing the soft output Viterbi algorithm (SOVA).

The dynamic quantizer proposed by the invention comprises a reliability discriminator, a heterogeneity eliminator, and a quantizer. The reliability discriminator estimates the reliability of the equalized signals by setting a window to collect the equalized signals and observing a distribution of the equalized signals within the window, and then determines a number of quantization bits by comparing the estimated reliability to preset thresholds. The reliability discriminator determines the window size depending on a given channel condition. The preset thresholds for quantization bits determination is decided by the system. The reliability discriminator judges the equalized signals to be reliable if the number of equalized signals collected within the window is less than a predetermined amount.

The heterogeneity eliminator determines an appropriate range for quantization by calculating an absolute mean of the equalized signals, determining distances between the equalized signals and the absolute mean, and discarding the equalized signal if the corresponding distance is greater than an allowable distance. The quantizer is a uniform quantizer, which divides the appropriate range obtained from the heterogeneity eliminator into equal states according to the number of quantization bits determined by the reliability discriminator, and assigns each equalized signal to a corresponding state.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION

Figure 1:
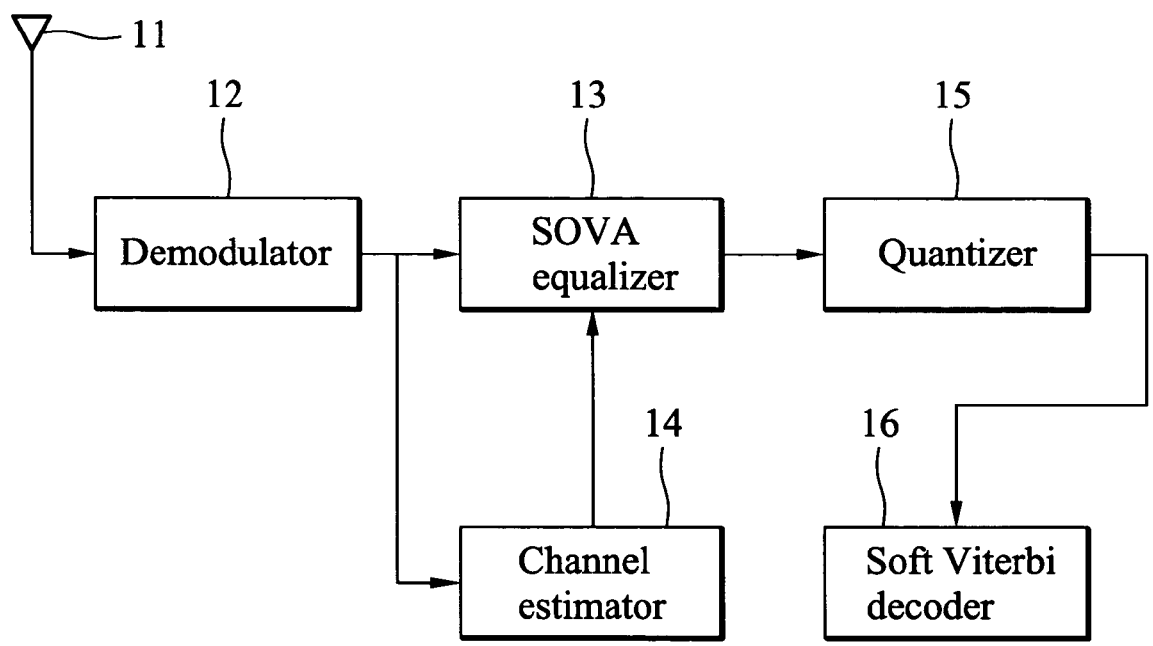
FIG. 1 is a block diagram illustrating the structure of a conventional receiver for a wireless communication system.
Figure 2:
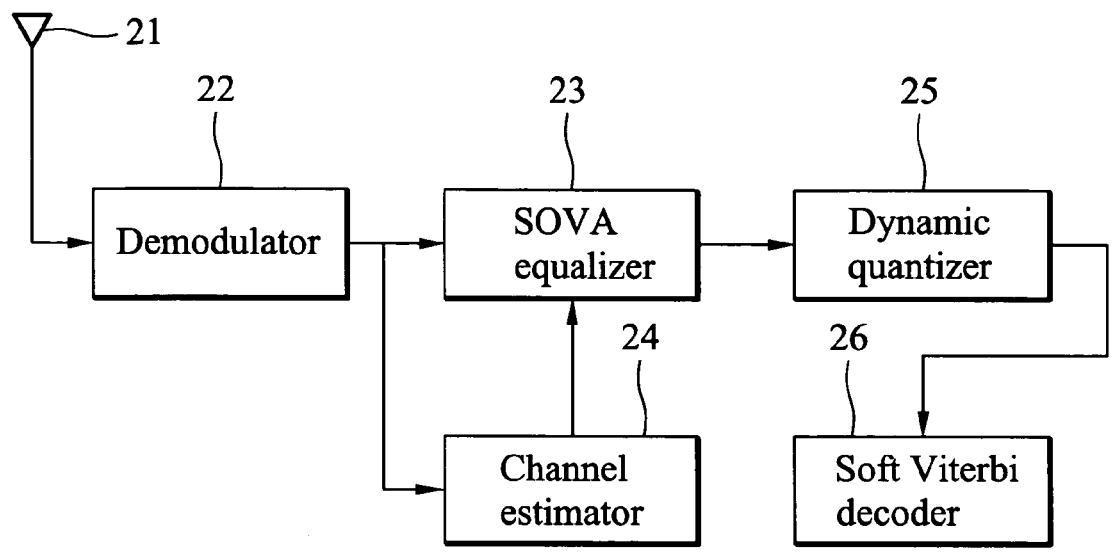
FIG. 2 is a block diagram illustrating the structure of a receiver for a wireless communication system according to an embodiment of the invention.

FIG. 2 is a block diagram showing the structure of the receiver according to an embodiment of the invention. The receiver in FIG. 2 is very similar to the receiver in FIG. 1 except that a dynamic quantizer 25 is coupled to the SOVA equalizer 23 and the soft Viterbi decoder 26. The conventional quantizer 15 shown in FIG. 1 determines the number of quantization levels regardless of channel conditions, which results in use of too many bits to represent the equalized outputs when the channel condition is good. This Viterbi decoder 16 may suffer from unnecessary computational burden and consume excess power. The dynamic quantizer 25 adapts the number of quantization levels according to the channel conditions. In order to alleviate the decoding load of the soft Viterbi decoder 26, less quantized bits are used if the channel condition is good. When the channel condition becomes worse, more quantized bits are inevitably applied to represent the equalized results.

Figure 3:
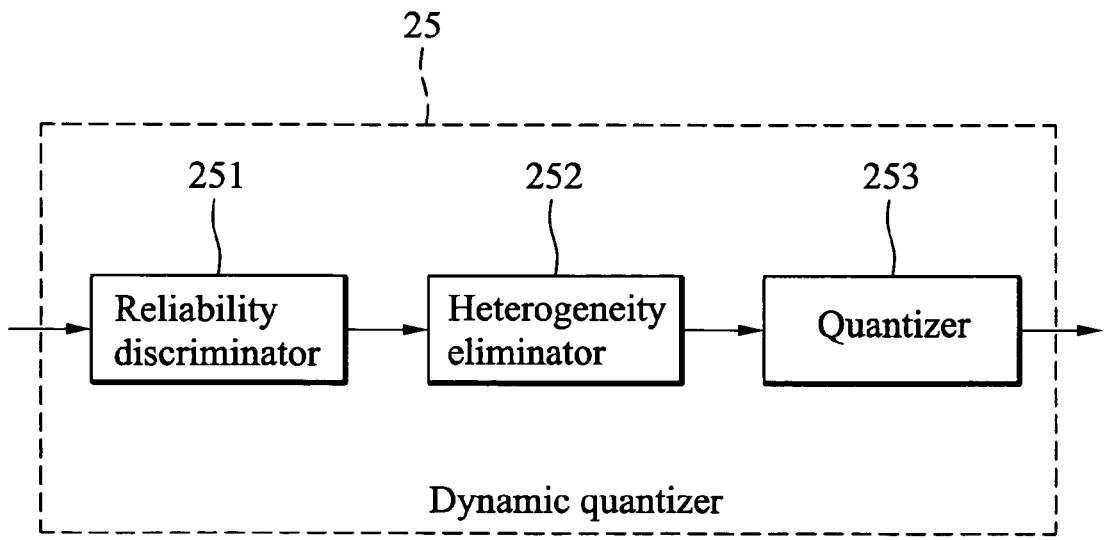
FIG. 3 is a block diagram illustrating the dynamic quantizer according to an embodiment of the invention.

The block diagram of the proposed dynamic quantizer 25 shown in FIG. 2 is demonstrated in FIG. 3. The dynamic quantizer 25 comprises three sub-blocks for altering the number of quantization levels adaptively. The functions of the sub-blocks are described in the following.

Figure 4A:
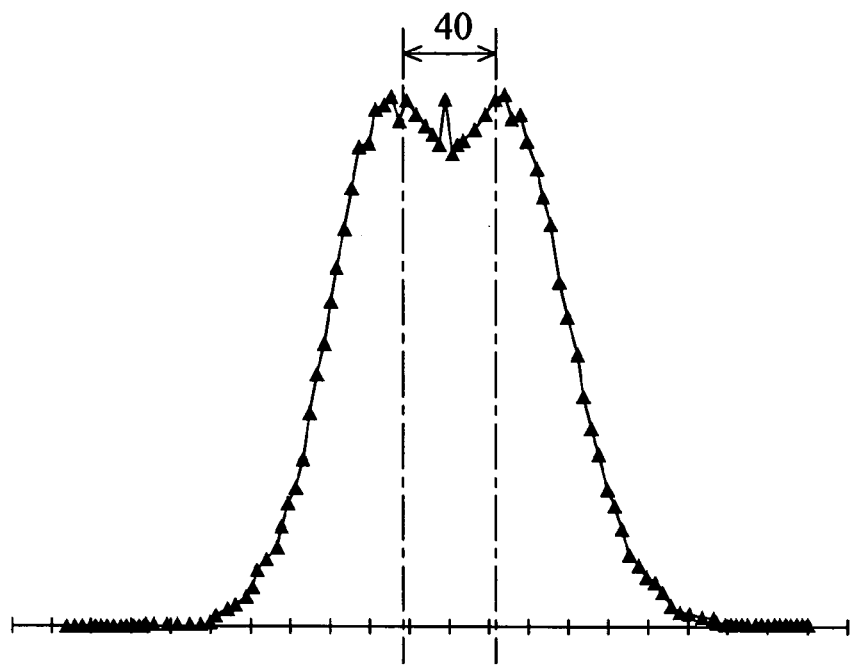
FIG. 4a illustrates the signal reliability discrimination when the channel condition is relatively bad.
Figure 4B:
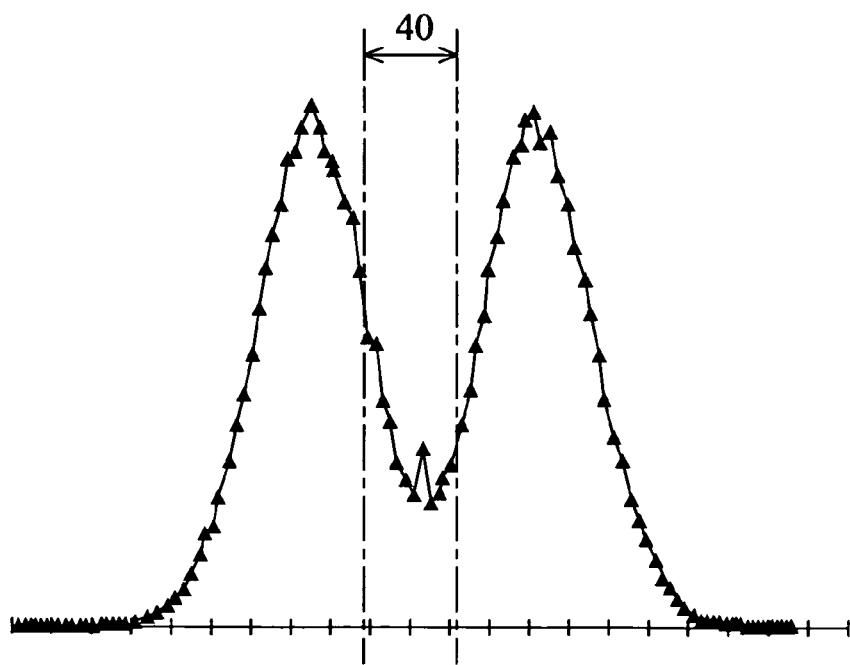
FIG. 4b illustrates the signal reliability discrimination when the channel condition is relatively good.
Figure 5:
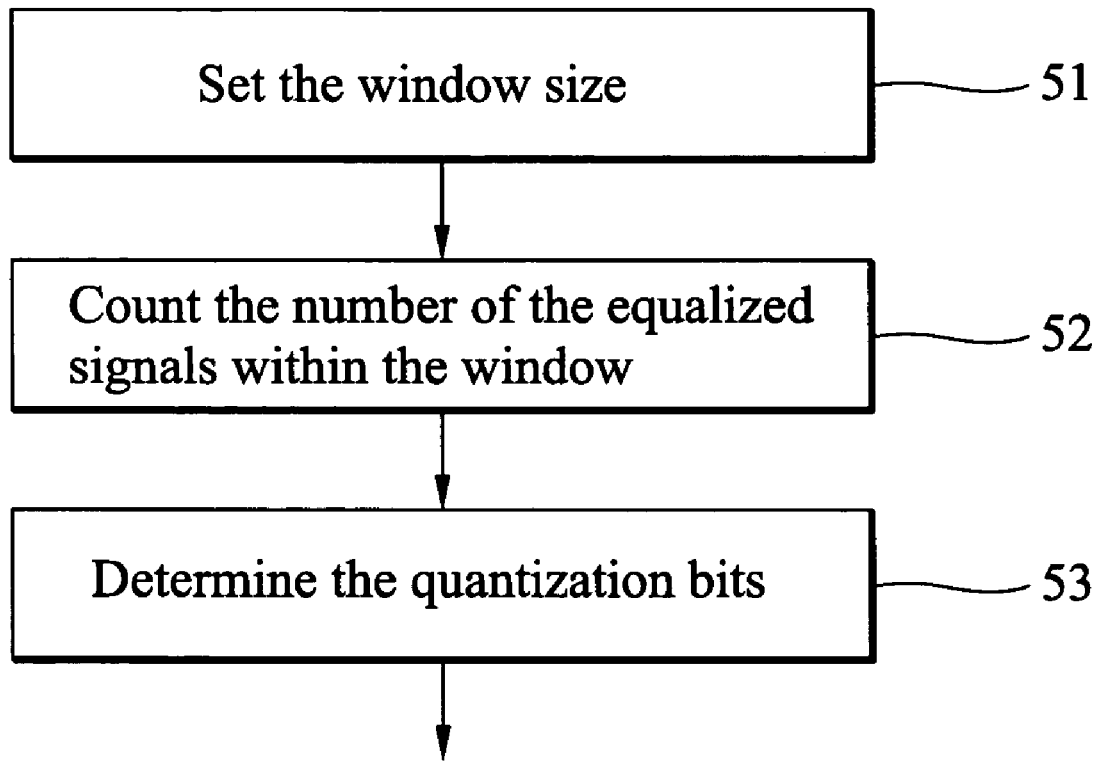
FIG. 5 is a flowchart showing the operations of the reliability discriminator according to an embodiment of the invention.

Prior to quantizing the equalized signals, it is necessary to estimate the corresponding reliability thereof to reduce the excess quantization bits. Since the equalized signals are of different reliability, the reliability discriminator 251 considers different amounts of quantization bits. In the reliability discriminator 251, a window is first set to collect the equalized signals. Generally, the appropriate window size may effectively discriminate the reliability of the equalized signals. FIGS. 4a and 4b show two examples representing different signal reliability by observing the distributions of the equalized signals. The horizontal scale of the signal distribution diagrams in FIGS. 4a and 4b indicates the value of the equalized signals, whereas the vertical scale indicates the frequency (count) of equalized signals. As shown in FIG. 4a, the equalized signals with a low signal to noise ratio (SNR), are considered as unreliable, if more signals are collected in the preset window 40. As shown in FIG. 4b, the equalized signals with high SNR are referred to as reliable if fewer signals are collected within the window. The thresholds for quantization bits determination is decided by the system, and the window size is set dependent on the given channel condition. The operation of the reliability discriminator is illustrated in FIG. 5, as the first step (step 51) is to set the window size, then the number of equalized signals within the window are counted (step 52), finally, the number of required quantization bits are determined by comparing the number of signals in the window to predetermined thresholds (step 53).

Figure 6:
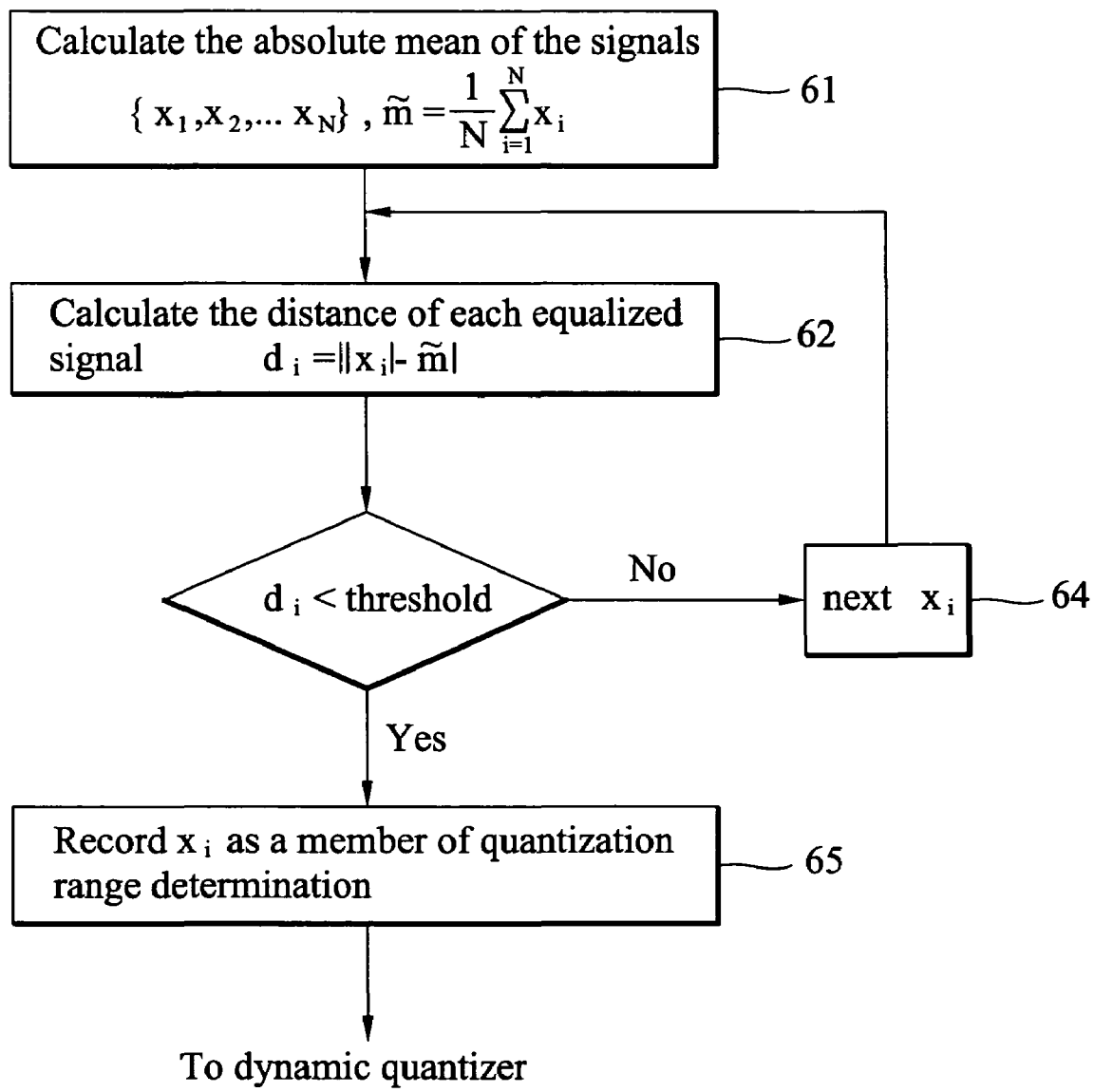
FIG. 6 is a flowchart showing the operations of the heterogeneity eliminator according to an embodiment of the invention.

After determining the reliability of the equalized signals in the reliability discriminator, the heterogeneity eliminator 252 eliminates the heterogeneous signals to mitigate the quantization error. The flowchart shown in FIG. 6 illustrates the operation of the heterogeneity eliminator 252. The absolute mean of the equalized signals is first calculated in step 61, and the distances between each equalized signal and the absolute mean are determined in step 62. The signal is regarded as a heterogeneous signal relative to other equalized signals if the corresponding distance is larger than the threshold. It is not necessary to consider such signals when determining the quantization interval.

The quantizer 253 of FIG. 3 employs uniform quantization after the number of quantization levels is determined. The main advantage of implementing uniform quantization is its simplicity. In the case of uniform quantization, the determined range is divided into equal sub-intervals called "steps". The quantizer 253 assigns each equalized signal with a corresponding sub-interval. Each sub-interval is thus represented using the number of quantization bits determined by the reliability discriminator. The signal values exceeding the maximum or minimum values of the quantization interval are assigned to the respective maximum or minimum sub-interval.

Finally, while the invention has been described by way of examples and in terms of the above, it is to be understood that the invention is not limited to the disclosed embodiments. On the contrary, it is intended to cover various modifications as would be apparent to those skilled in the art.

What is claimed is:

1. A dynamic quantizer for quantizing equalized signals output from an equalizer in a receiver, comprising:
   a reliability discriminator, operative to estimate a reliability for the equalized signals by setting a window to collect the equalized signals and observing a distribution of the equalized signals within the window, and operative to determine a quantization bit number according to the estimated reliability, wherein the quantization bit number corresponding to high reliability is less than the quantization bit number corresponding to low reliability; and
   a quantizer, operative to assign each equalized signal to a corresponding state defined by the quantization bit number.

2. The dynamic quantizer according to claim 1, wherein the reliability discriminator determines the window size depending on a given channel condition.

3. The dynamic quantizer according to claim 1, wherein the reliability discriminator judges the equalized signals to be reliable if the number of equalized signals collected within the window is less than a predetermined amount as the channel condition is considered adequate.

4. The dynamic quantizer according to claim 1, wherein the reliability discriminator determines the quantization bit number by comparing the estimated reliability to preset thresholds.

5. The dynamic quantizer according to claim 4, wherein the preset thresholds for quantization bits determination is decided by the system.

6. The dynamic quantizer according to claim 1, further comprising a heterogeneity eliminator operative to determine an appropriate range for quantization by calculating an absolute mean of the equalized signals, determine distances between the equalized signals and the absolute mean, and discard the equalized signal if the corresponding distance is greater than an allowable distance.

7. The dynamic quantizer according to claim 6, wherein the quantizer divides the appropriate range determined by the heterogeneity eliminator into equal states according to the number of quantization bits determined by the reliability discriminator.

8. The dynamic quantizer according to claim 1, wherein the quantizer is a uniform quantizer.

9. A dynamic quantization method for quantizing equalized signals, comprising:

estimating a reliability for the equalized signals by setting a window to collect the equalized signals and observing a distribution of the equalized signals within the window and determining a quantization bit number according to the estimated reliability, wherein the quantization bit number corresponding to high reliability is less than the quantization bit number corresponding to low reliability; and assigning each equalized signal to a corresponding state defined by the quantization bit number.

10. The dynamic quantization method according to claim 9, wherein the window size is determined depending on a given channel condition.

11. The dynamic quantization method according to claim 9, wherein the equalized signals are judged to be reliable if the number of equalized signals collected within the window is less than a predetermined amount as the channel condition is considered adequate.

12. The dynamic quantization method according to claim 9, wherein the quantization bit number is determined by comparing the estimated reliability to preset thresholds.

13. The dynamic quantization method according to claim 12, wherein the preset thresholds for quantization bit determination is decided by the system.

14. The dynamic quantization method according to claim 9, further comprises determining an appropriate range for quantization by calculating an absolute mean of the equalized signals, determining distances between the equalized signals and the absolute mean, and discarding the equalized signal if the corresponding distance is greater than an allowable distance.

15. The dynamic quantization method according to claim 14, further comprising dividing the appropriate range into equal states according to the determined number of quantization bits.

16. A receiver for a wireless communication system, comprising:

a reception unit, for receiving signals from a dynamically fading channel;

a demodulator, coupled to the reception unit for demodulating the received signals;

an equalizer, coupled to the demodulator for equalizing the demodulated signals according to an estimated fading of the received signals;

an dynamic quantizer, coupled to the equalizer for quantizing the equalized signals adaptively relying on a predicted channel condition which assigns a quantization bit number for representing quantization states, wherein the quantization bit number corresponding to a good channel condition is less than the quantization bit number corresponding to a bad channel condition;

a decoder, coupled to the dynamic quantizer for decoding the quantized signals;

a reliability discriminator, operative to estimate reliability for the equalized signals by setting a window to collect the equalized signals and observing a distribution of the equalized signals within the window, and determine a quantization bit number by comparing the estimated reliability to preset thresholds;

a heterogeneity eliminator, operative to determine an appropriate range for quantization by calculating an absolute mean of the equalized signals, determine distances between the equalized signals and the absolute mean, and discard the equalized signal if the corresponding distance is greater than an allowable distance; and a quantizer, operative to divide the appropriate range determined by the heterogeneity eliminator into equal states according to the quantization bit number determined by the reliability discriminator, and assign each equalized signal to a corresponding state.

17. The receiver according to claim 16, wherein the equalizer is a soft decision equalizer.

18. The receiver according to claim 16, wherein the decoder is a soft decision decoder.

19. The receiver according to claim 16, wherein the equalizer and the decoder implement the Viterbi algorithm that performs efficient maximum-likelihood sequence estimation (MLSE).

20. The receiver according to claim 16, wherein the reliability discriminator determines the window size depending on a given channel condition.

21. The receiver according to claim 16, wherein the preset thresholds for quantization bit determination is decided by the system.

22. The receiver according to claim 16, wherein the reliability discriminator judges the equalized signals to be reliable if the number of equalized signals collected within the window is less than a predetermined amount as the channel condition is considered adequate.

* * * * *